(12) United States Patent
Halasur et al.

(10) Patent No.: US 11,654,492 B2
(45) Date of Patent: May 23, 2023

(54) INDEXABLE DRILLING INSERTS

(71) Applicant: KENNAMETAL INDIA LIMITED, Bangalore (IN)

(72) Inventors: Ravi Halasur, Bangalore (IN); Mahesh Todkar, Bangalore (IN)

(73) Assignee: KENNAMETAL INDIA LTD., Bangalore (IN)

( * ) Notice: Subject to any disclaimer, the term of this patent is extended or adjusted under 35 U.S.C. 154(b) by 112 days.

(21) Appl. No.: 16/898,811

(22) Filed: Jun. 11, 2020

(65) Prior Publication Data
US 2020/0391297 A1   Dec. 17, 2020

(30) Foreign Application Priority Data

Jun. 13, 2019   (IN) .............................. 201941023533

(51) Int. Cl.
| | | |
|---|---|---|
| *B23B 27/14* | (2006.01) | |
| *B23B 27/16* | (2006.01) | |
| *B23B 51/00* | (2006.01) | |

(52) U.S. Cl.
CPC .......... *B23B 27/143* (2013.01); *B23B 27/145* (2013.01); *B23B 27/1611* (2013.01); *B23B 51/0008* (2022.01); *B23B 51/0011* (2022.01); *B23B 2200/204* (2013.01); *B23B 2200/208* (2013.01); *B23B 2251/50* (2013.01)

(58) Field of Classification Search
CPC . B23B 27/143; B23B 27/145; B23B 27/1611; B23B 2200/204; B23B 2251/50; B23B 51/00; B23B 2200/125; B23B 2200/208; B23B 27/141; B23B 27/14; B23B 51/0008; B23B 51/0011
See application file for complete search history.

(56) References Cited

U.S. PATENT DOCUMENTS

| | | | |
|---|---|---|---|
| 4,475,851 A | 10/1984 | Hale | |
| 4,648,760 A | 3/1987 | Karlsson et al. | |
| 4,990,036 A * | 2/1991 | Eklund | ................. B23B 27/141 407/115 |

(Continued)

FOREIGN PATENT DOCUMENTS

| | | |
|---|---|---|
| JP | 60109806 | 7/1985 |
| JP | 1985109806 | 7/1985 |

(Continued)

OTHER PUBLICATIONS

Jan. 19, 2021 Search report EP App. No. 20189283.3.

(Continued)

*Primary Examiner* — Eric A. Gates
(74) *Attorney, Agent, or Firm* — Christopher J. Owens (57) ABSTRACT

Drilling tool systems including a drilling body and a drilling inserts are disclosed. The drilling inserts include four indexable cutting edges. The four cutting edges may each comprise a plurality of cutting edge segments and a wiper edge. The plurality of cutting edge segments and the wiper edge are provided at distinct angles to provide effective chip breaking and a stronger cutting edge at the drilling insert corners. Furthermore, the side surfaces of the drilling inserts allow the drilling insert to be more stably supported in a pocket of the drilling body. The drilling inserts may be used in a peripheral pocket of a drilling body.

15 Claims, 8 Drawing Sheets

(56) References Cited

U.S. PATENT DOCUMENTS

| | | |
|---|---|---|
| 5,221,164 A | 6/1993 | Allaire |
| 5,503,509 A | 4/1996 | Von Haas et al. |
| 5,597,271 A | 1/1997 | Men et al. |
| 5,630,681 A | 5/1997 | Paya |
| 5,634,747 A | 6/1997 | Tukala et al. |
| 5,807,031 A | 9/1998 | Arai et al. |
| 5,890,853 A | 4/1999 | Hiranaka |
| 5,954,459 A | 9/1999 | Noguchi |
| 5,971,672 A | 10/1999 | Hansson |
| 5,971,676 A | 10/1999 | Kojima |
| 6,039,515 A | 3/2000 | Lamberg |
| 6,186,705 B1 | 2/2001 | Kumar et al. |
| 6,257,807 B1 | 7/2001 | Heinloth |
| 6,543,970 B1 | 4/2003 | Qvarth et al. |
| 6,948,891 B2 | 9/2005 | Roman |
| 7,201,542 B2 | 4/2007 | Fritsch et al. |
| 8,651,778 B2 | 2/2014 | Okumura |
| 8,926,234 B2 * | 1/2015 | Engstrom ............... B23C 5/202 407/113 |
| 9,168,589 B2 | 10/2015 | Ramesh |
| 9,272,335 B2 | 3/2016 | Ramesh |
| 9,782,844 B2 | 10/2017 | Ogata |
| 2001/0033779 A1 | 10/2001 | Wiman et al. |
| 2002/0061235 A1 | 5/2002 | Maier |
| 2003/0161696 A1 | 8/2003 | Fritsch et al. |
| 2003/0180103 A1 | 9/2003 | Nagaya |
| 2003/0223832 A1 | 12/2003 | Roman et al. |
| 2003/0223833 A1 | 12/2003 | Roman |
| 2005/0111928 A1 | 5/2005 | Stanarius et al. |
| 2005/0260049 A1 | 11/2005 | Kruszynski |
| 2006/0260439 A1 | 11/2006 | Tubinger et al. |
| 2007/0201962 A1 | 8/2007 | Limell et al. |
| 2008/0075547 A1 | 3/2008 | Wolf |
| 2008/0170921 A1 | 7/2008 | Sjoo |
| 2008/0181737 A1 | 7/2008 | Limell et al. |
| 2008/0219791 A1 | 9/2008 | Nasu et al. |
| 2008/0304925 A1 | 12/2008 | Meyer et al. |
| 2009/0071723 A1 | 3/2009 | Mergenthaler et al. |
| 2009/0238649 A1 | 9/2009 | Kruszynski et al. |
| 2009/0245949 A1 | 10/2009 | Takahashi |
| 2010/0034606 A1 * | 2/2010 | Nasu ...................... B23B 51/00 408/230 |
| 2010/0034607 A1 * | 2/2010 | Meyer .................. B23B 51/126 408/189 |
| 2010/0061821 A1 | 3/2010 | Okumura |
| 2010/0178122 A1 | 7/2010 | Bae |
| 2010/0272526 A1 | 10/2010 | Dufour et al. |
| 2010/0296884 A1 | 11/2010 | Okumura |
| 2010/0322732 A1 | 12/2010 | Mergenthaler |
| 2010/0329804 A1 | 12/2010 | Okumura |
| 2013/0022422 A1 | 1/2013 | Ramesh |
| 2013/0022423 A1 | 1/2013 | Ramesh |
| 2013/0129435 A1 | 5/2013 | Ortlund et al. |
| 2013/0243537 A1 | 9/2013 | Ogata |
| 2013/0315684 A1 | 11/2013 | Ramesh |
| 2014/0133931 A1 | 5/2014 | Bae |
| 2014/0161552 A1 | 6/2014 | Ramesh |
| 2014/0212235 A1 | 7/2014 | Prast et al. |
| 2014/0286719 A1 | 9/2014 | Ramesh |
| 2016/0023282 A1 | 1/2016 | Ramesh |
| 2016/0297011 A1 | 10/2016 | Park et al. |
| 2017/0001248 A1 | 1/2017 | Ramesh |
| 2018/0029141 A1 | 2/2018 | Ishi |
| 2018/0111205 A1 | 4/2018 | Ishi |

FOREIGN PATENT DOCUMENTS

| | | | |
|---|---|---|---|
| JP | 2008207283 A | | 9/2008 |
| JP | 2009178787 A | * | 8/2009 |
| JP | 2010099778 | | 5/2010 |
| SE | 9203716 | | 12/1992 |
| SE | 9701494 | | 10/1998 |
| SE | 9701494 | | 2/1999 |
| SE | 0201588 | | 5/2002 |
| SE | 0201587 | | 11/2003 |
| SE | 0402760 | | 5/2006 |
| SE | 0500234 | | 8/2006 |
| WO | WO2019039724 A1 | | 2/2019 |

OTHER PUBLICATIONS

Feb. 18, 2022 Non-Final OA—U.S. Appl. No. 16/992,833.
Jun. 20, 2022 Final Office Action (US Only) U.S. Appl. No. 20210046555A1.
Jul. 23, 2021 EPO Notification R.70b(1) EP App. No. 3778083.

* cited by examiner

INDEXABLE DRILLING INSERTS

RELATED APPLICATION DATA

The present application claims priority pursuant to 35 U.S.C. § 119(a) to Indian Patent Application Number 201941023533 filed Jun. 13, 2019, which is incorporated herein by reference in its entirety.

FIELD

The present invention relates to cutting tools, including drilling inserts and drilling bodies. In particular, the present invention relates to indexable and replaceable drilling inserts and drilling bodies configured to engage and secure the indexable and replaceable drilling inserts.

BACKGROUND

Drilling tools are used to drill cylindrical holes in metallic work pieces. The cutting or boring action of the drilling tools may be carried out by an elongated, substantially cylindrical drilling tool, such as a combination of a tool holder and a drill insert, which is selectively attached thereto. Such an arrangement may then be used in an application wherein one end of the tool holder is securely mounted in a driving apparatus, which rotates the holder about its longitudinal axis. At the opposite end of the elongated tool holder, the cutting insert engages the material to be cut. Alternatively, the work piece may be made to rotate relative to the holder and cutting insert, such as in positioning the holder in the tail stock of a lathe or the like. Further, the tool and work piece may be made to rotate relative to one another. The use of cutting inserts allows for quick changing of the insert upon wear of the cutting surfaces instead of the entire tool, and allows for one tool to be used for a variety of different hole-making applications by simply changing the insert and not the entire drill assembly.

Indexable drill inserts allow all the sides of an insert to be used for cutting one after the other. Further, use of inserts reduces the manufacturing lead time and assembling time.

Conventional quadrangular indexable drill inserts comprise four rectangular cutting edges for cutting the work piece. The use of rectangular cutting edges generally makes the drill drift away from its center because of the forces acting all over the drill body and not exactly at the center. The drill drift further creates a narrow wall which is not feasible in practical applications. Conventional indexable drill inserts rub the surface of the drilled hole, if the diameter of the drill hole is less than the pre-desired value.

Conventional drill inserts and drill bodies generally require both the central insert and peripheral inserts to be moved either radially inward and/or outward or axially forward and/or rearward to effectively provide a range of cutting diameters.

SUMMARY

Drilling inserts having four cutting edges and drilling bodies are provided. The four cutting edges may each comprise a plurality of cutting edge segments and a wiper edge. The plurality of cutting edge segments and the wiper edge are provided at distinct angles with respect to a reference plane of the drilling insert to provide effective chip breaking and a stronger cutting edge at the drilling insert corners. Furthermore, the side surfaces of the drilling inserts allow the drilling insert to be more stably supported in a pocket of the drilling body. The drilling inserts may be used in a peripheral pocket of a drilling body. As understood by those skilled in the art, these inserts may also be referred to as outboard inserts.

An aspect of the present invention is to provide a drilling insert comprising a top surface, a bottom surface having a smaller surface area than the top surface, four side surfaces adjoining the top surface and the bottom surface, four cutting edges at the intersection of each of the side surfaces and the top surface defining four corner edge portions at intersections between adjacent cutting edges, each of the cutting edges comprising a first cutting edge segment extending from a first one of the corner edge portions radially outward from a central longitudinal rotational axis of a drilling body when the drilling insert is mounted in the drilling body at a first cutting edge angle with respect to a reference plane normal to the top surface of the drilling insert and parallel to an axis of rotation of the drilling insert, a second cutting edge segment extending from the first cutting edge at a second cutting edge angle with respect to the reference plane, and a wiper edge located radially inward from the central longitudinal rotational axis of the drilling body in relation to the first cutting edge segment at a wiper edge angle with respect to the reference plane to a second one of the corner portions.

Another aspect of the present invention is to provide a drilling tool system comprising a plurality of drilling bodies having different cutting diameters, each drilling body having a central longitudinal rotational axis, and comprising a central insert mounted in a central pocket and a peripheral insert mounted in a peripheral pocket in a front drilling face, and a first of the drilling bodies having a cutting diameter that is smaller than a cutting diameter of a second of the drilling bodies, wherein an axis of rotation of the central insert mounted in the central pocket of the first and the second of the drilling bodies is located in the same axial and radial location, wherein an axis of rotation of the peripheral insert mounted in the peripheral pocket of the first of the drilling bodies is radially closer to the axis of rotation of the central insert mounted in the central pocket than an axis of rotation of the peripheral insert mounted in the peripheral pocket of the second of the drilling bodies.

These and other aspects of the present invention will be more apparent from the following description.

DETAILED DESCRIPTION

Figure 1:
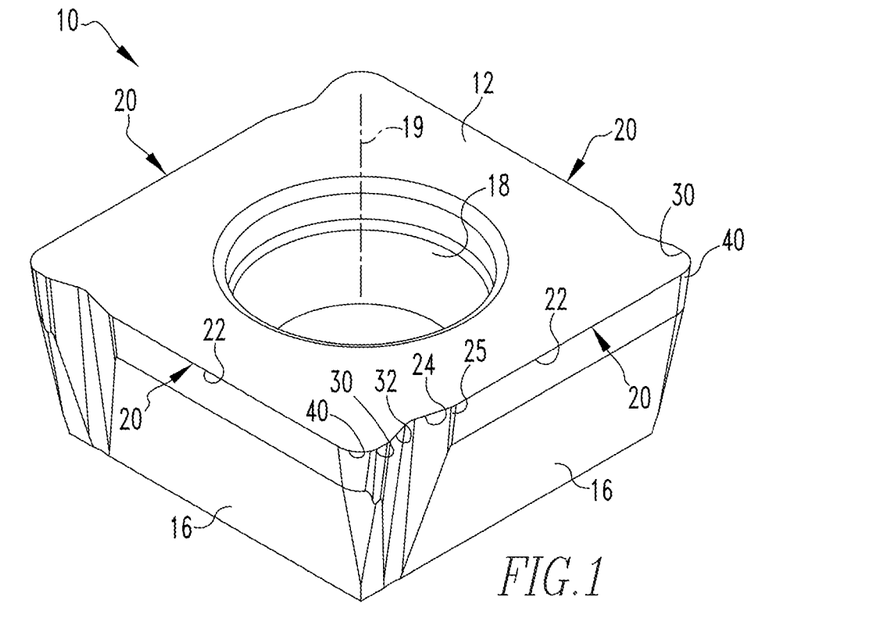
FIG. 1 is a top isometric view of a drilling insert in accordance with an embodiment of the present invention.
Figure 2:
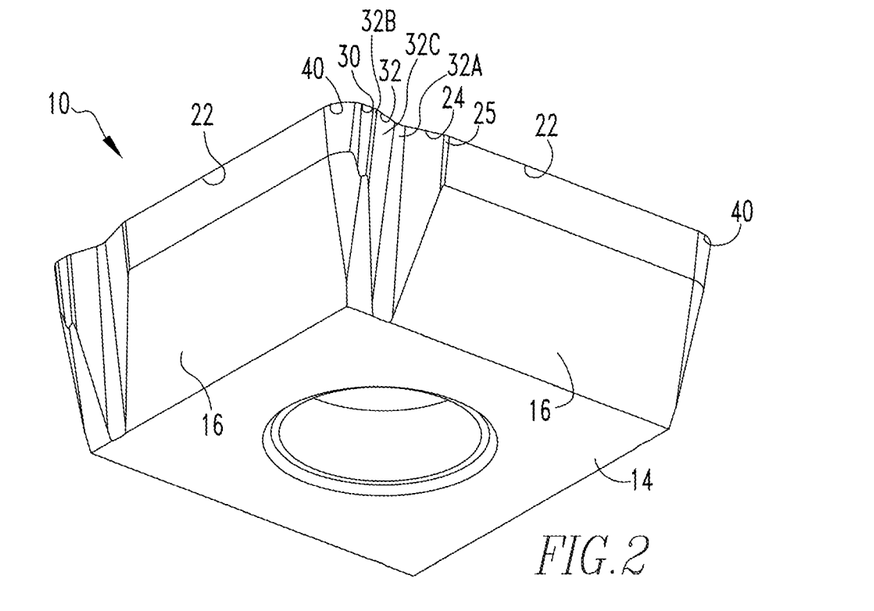
FIG. 2 is a bottom isometric view of the drilling insert of FIG. 1.
Figure 5:
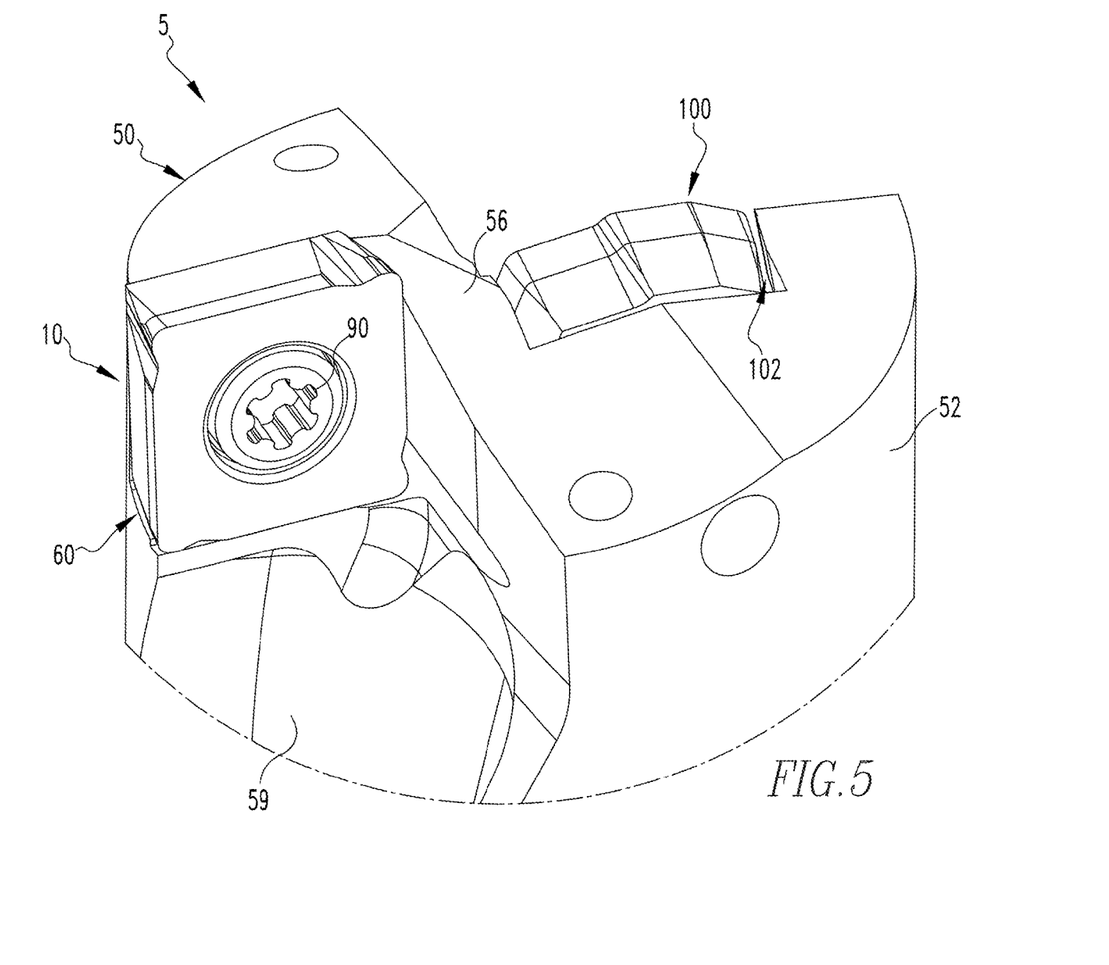
FIG. 5 is an isometric view of a drilling body including in a peripheral insert in a peripheral pocket of the drilling body and a drilling insert in a central pocket of the drilling body and in accordance with an embodiment of the present invention.
Figure 6:
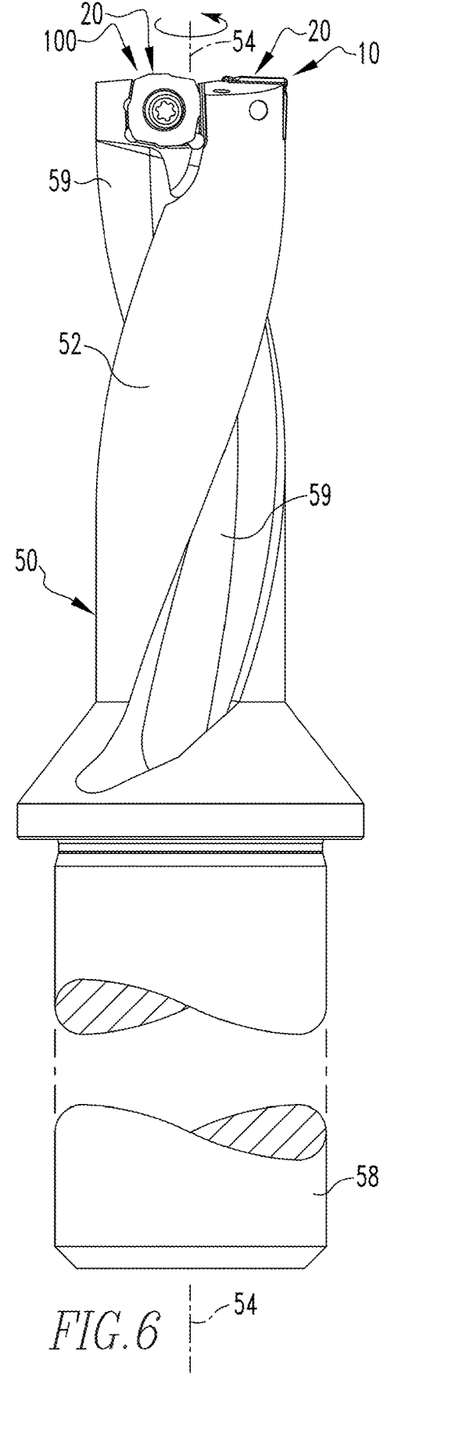
FIGS. 6 and 7 are side views of a drilling body including a peripheral insert in a peripheral pocket of the drilling body and a drilling insert in a central pocket of the drilling body in accordance with an embodiment of the present invention.
Figure 7:
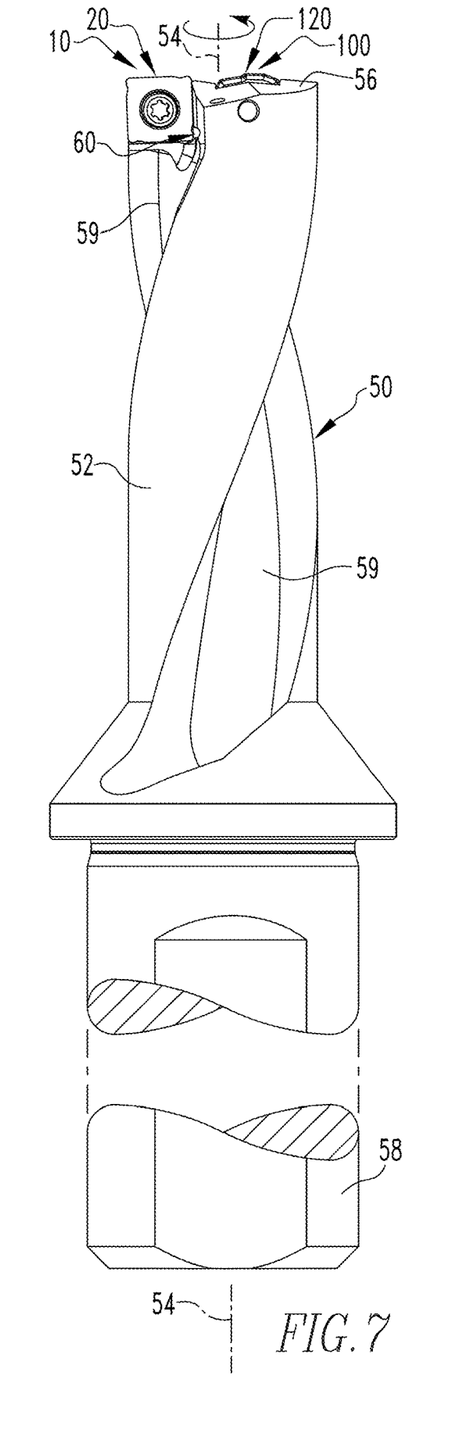

FIGS. 1 and 2 illustrate top and bottom isometric views of an indexable peripheral drilling insert 10 in accordance with an embodiment of the present invention. The drilling insert 10 comprises a top surface 12, a bottom surface 14 and a side surface 16 adjoining the top and bottom surfaces 12 and 14. In accordance with an embodiment of the present invention, the body of the drilling insert is structured and arranged so that the side surfaces 16 slope or slant generally inwardly from the top surface 12 to the bottom surface 14 such the bottom surface 14 may have a smaller surface area than the top surface 12 to provide a positive cutting geometry between the drilling insert 10 and a pocket 60 in a drilling body 50, as shown in FIGS. 5-7. The top surface 12 is intersected by the side surface 16 to form a cutting edge 20 on each side of the drilling insert 10.

As shown in FIGS. 1 and 2, the indexable drilling insert 10 comprises a mounting through hole 18 extending from the top surface 12 to the bottom surface 14. A central axis 19 of the mounting through hole 18 is perpendicular to the top surface 12 and the bottom surface 14. The central axis 19 defines an axis of rotation of the drilling insert 10. The mounting through hole 18 is structured and arranged to receive an insert screw 90.

In accordance with an embodiment of the present invention, each cutting edge 20 may be formed by a plurality of cutting edge segments and a wiper edge. As shown in FIGS. 1-4, each cutting edge 20 is formed by a first cutting edge segment 22 and a second cutting edge segment 24. In accordance with an embodiment of the present invention, the drilling insert 10 is mounted in the drilling body 50 having a generally cylindrical body 52 with a central longitudinal rotational axis 54. In certain embodiments, when the drilling insert 10 is mounted in the drilling body 50, the first cutting edge segment 22 is located radially outward from the central longitudinal rotational axis 54 compared to the second cutting edge segment 24 and the wiper edge 30. In accordance with an embodiment of the present invention, each cutting edge 20 may be formed by identical cutting edge segments. In accordance with an embodiment of the present invention, the first and second cutting edge segments 22 and 24 are substantially linear. In accordance with an embodiment of the present invention, the orientation and length of the plurality of cutting edge segments 22 and 24 provide stronger corner edge portions, prevent drifting of a drill body 50 from its center and more effectively direct the cutting forces, as further described below.

As shown in FIGS. 6, 7, 9 and 10, the width and location of the peripheral insert 10 and the central drilling insert 100 are selected to allow the operational cutting ranges of the inserts to overlap during rotation of the drilling body 50. In accordance with an embodiment of the present invention, the orientation and length of the plurality of cutting edge segments 22 and 24 the peripheral drilling insert 10 are selected to allow substantially equal cutting to be performed by the peripheral drilling insert 10 and the central insert 100, as further described below As shown in FIGS. 1 and 3A-3C, each cutting edge 20 of the drilling insert 10 comprises a transitional cutting edge segment 32 connecting the second cutting edge segment 24 to a wiper edge 30. In certain embodiments, the transitional cutting edge segment 32 forms a concave curve 32A with the second cutting edge segment 24 and a convex curve 32B with the wiper edge 30. In accordance with an embodiment of the present invention, the wiper edge 30 is spaced from, not continuous with, and/or not adjacent to the first cutting edge segment 22. In the embodiment shown, the transitional cutting edge segment 32 may include a linear portion 32C between the concave curve 32A formed with the second cutting edge segment 24 and the convex curve 32B formed with the wiper edge 30. In accordance with an embodiment of the present invention, the wiper edge 30 may provide the drilling insert 10 with stable cutting operation and support against bending and the surface of the hole with an improved surface finish.

Figure 3A:
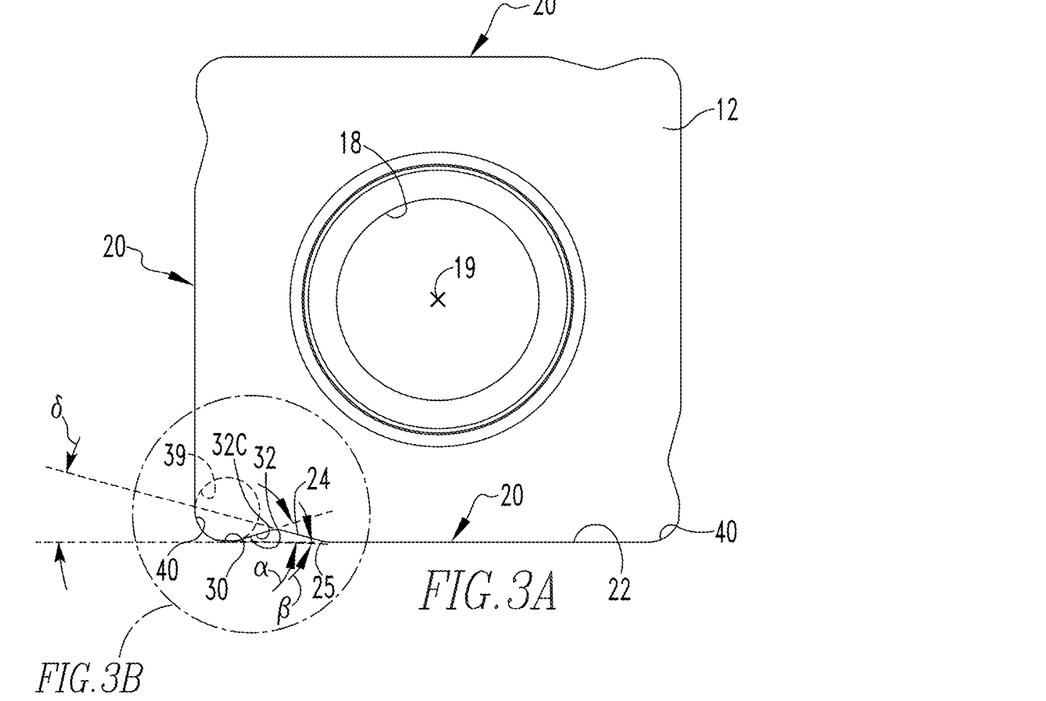
FIG. 3A is a top view of the drilling insert of FIG. 1.

In accordance with an embodiment of the present invention, the indexable drilling insert 10 comprises corner edge portions 40 formed between adjacent cutting edges 20. As shown in FIG. 3, each corner edge portion 40 is formed as rounded segment having a radius R that allows for a connection between adjacent cutting edges 20. For example, the corner edge portion 40 may connect the wiper edge 30 of one cutting edge 20 with a first cutting edge segment 22 of a subsequent cutting edge 20. In certain embodiments, the radius R of the corner edge portions 40 may be determined by the overall height of the insert 10 and the diameter D of an imaginary inscribed circle 38. The radius R of the corner edge portions 40 may form a smaller imaginary inscribed circle 39, as shown in FIG. 3A. For example, the radius R of each corner edge portion 40 may typically range from 0.1 to 1.6 mm, or from 0.2 to 1.2 mm, or from 0.3 to 0.8 mm. In a particular embodiment, the radius R of each corner edge portion 40 may be 0.4 mm.

As shown in FIG. 3A, the first cutting edge segment 22 extends substantially from a first corner edge portion 40 that is radially outward from the central longitudinal rotational axis 54 to form a main portion of the cutting edge 20.

As shown in FIG. 3A, the second cutting edge segment 24 extends radially inward in relation to the first cutting edge segment 22 at second cutting edge angle δ with respect to the first cutting edge segment 22, which in the embodiment shown is a negative angle. In accordance with an embodiment of the present invention, the second cutting edge angle δ allows the second cutting edge segment 24 to form a convex curve 25 with the first cutting edge segment 22. For example, the second cutting edge angle δ may typically range from 2.5 to 75 degrees, or from 5 to 45 degrees, or from 10 to 30 degrees. In a particular embodiment, the second cutting edge angle γ may be about 15 degrees.

As shown in FIG. 3A, the linear portion 32C of the transitional cutting edge 32 extends from a second cutting edge segment 24 at a transitional cutting edge angle α with respect to the first cutting edge segment 22 to a wiper edge 30 radially inward to the central longitudinal rotational axis 54. In the embodiment shown, the transitional cutting edge angle α is a positive angle rather than the negative angle of the second cutting edge segment 24. The transitional cutting edge angle α may form the concave curve 32A with the second cutting edge segment 24 and the convex curve 32B with the wiper edge 30. For example, the transitional cutting edge angle α may typically range from 2.5 to 75 degrees, or from 10 to 60 degrees, or from 15 to 45 degrees. In a particular embodiment, the transitional cutting edge angle α may be about 18 degrees.

Figure 3B:
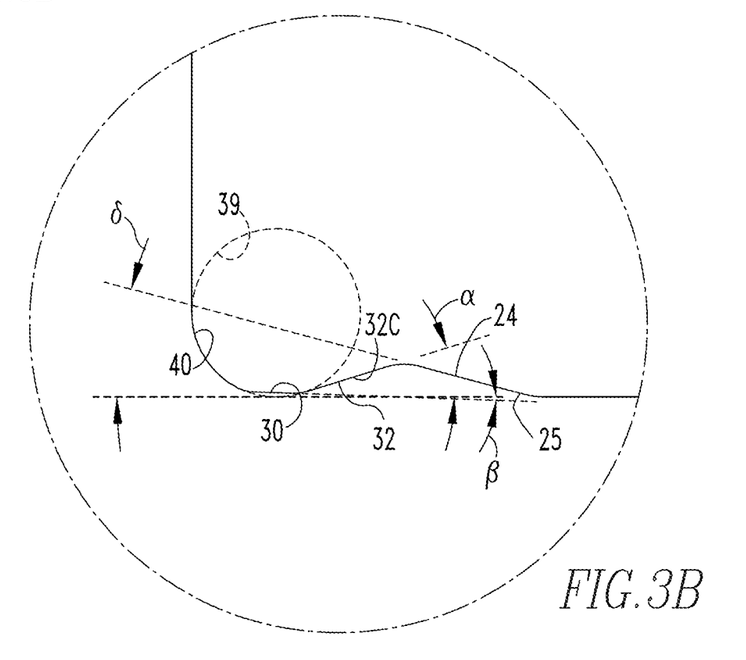
FIG. 3B is a magnified portion of the drilling insert of FIG. 3A.
Figure 9:
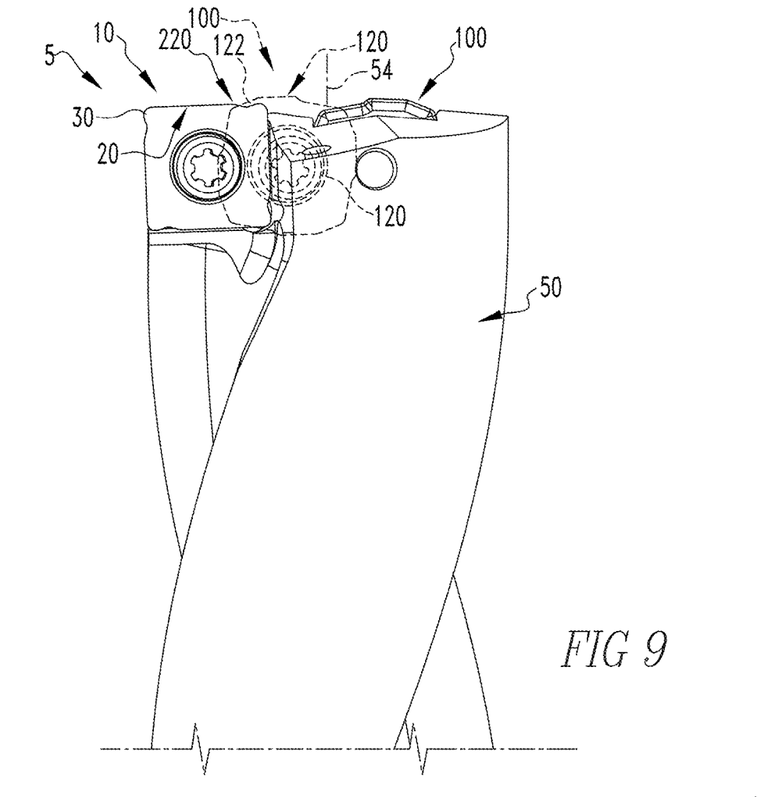
FIG. 9 is a partially schematic side view of a peripheral insert in a peripheral pocket of the drilling body and a drilling insert in a central pocket of the drilling body in accordance with an embodiment of the present invention.

As shown in FIGS. 3A and 3B, the wiper edge 30 extends from the transitional cutting edge at a wiper edge angle β with respect to the first cutting edge segment 22 to a second corner portion 30 radially inward to the central longitudinal rotational axis 54. In the embodiment shown, the wiper edge angle β is a negative angle and forms a convex curve 32B between the wiper edge 30 and the transitional cutting edge segment 32. For example, the wiper edge angle β may typically range from 0.5 to 10 degrees, or from 0.5 to 7 degrees, or from 0.5 to 3 degrees. In a particular embodiment, the wiper edge angle β may be about 2 degrees. In accordance with an embodiment of the present invention, the wiper edge angle β may be selected to allow the radially outermost wiper edge 30 to be parallel with the central longitudinal rotational axis 54 of the drilling body 50, as shown in FIG. 9. In accordance with an embodiment of the present invention, the wiper edge 30 may be linear or curvilinear. In the embodiment shown, the wiper edge angle β allows the wiper edge 30 to be not parallel with the first cutting edge segment 22.

In accordance with an embodiment of the present invention, the second cutting edge angle δ and the transitional cutting edge angle α may form a notch between the first cutting edge segment 22 and the wiper edge 30. When the cutting insert 10 is mounted in the drilling body 50, the notch allows only the wiper edge 30 of the radially outward cutting edge 20 to be the only portion of the cutting edge 20 to contact the machined surface of the work piece. The notch formed by the second cutting edge 24 and the transitional cutting edge 32 separates the wiper edge 30 from the first cutting edge segment 22. In accordance with an embodiment of the present invention, while the axially forward second cutting 24 may perform cutting, the transitional cutting edge segment 32 may not contact the work piece. The wiper edge 30 may form the drilled hole as a smooth cylinder and provides a desired surface finish.

Figure 3C:
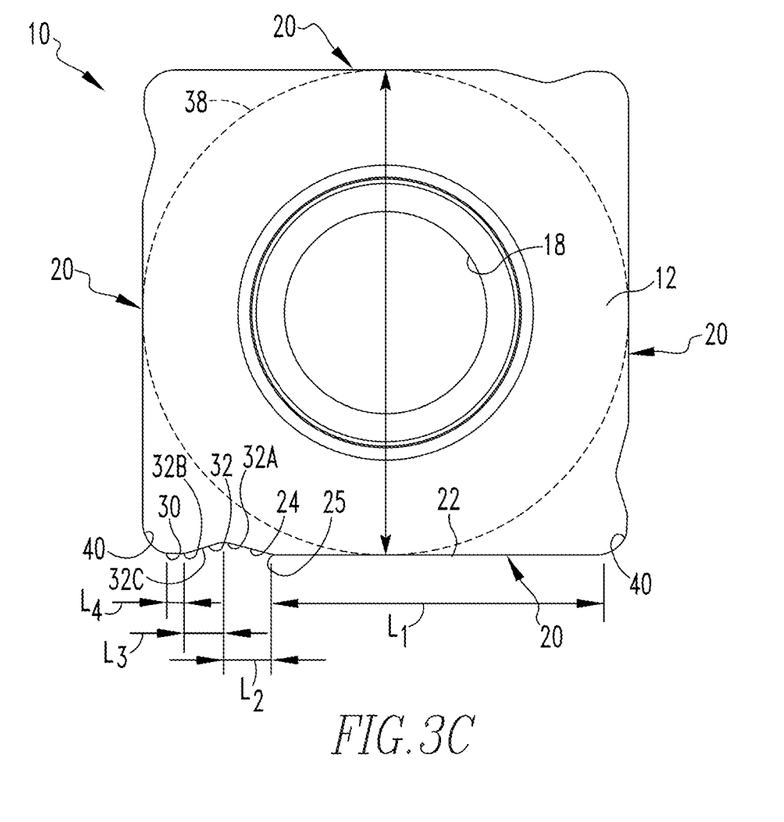
FIG. 3C is a top view of the drilling insert of FIG. 1.

As shown in FIG. 3C, the first cutting edge segment 22 has a length $L_1$, the second cutting edge segment 24 has a length $L_2$, the transitional cutting edge segment 32 has a length $L_3$ and the wiper edge 30 has a length $L_4$. The lengths of the plurality of cutting edge segments are selected to provide the desired direction of cutting forces and the allow for the rigid clamping of the drilling insert 10 in a pocket. In accordance with an embodiment of the present invention, the length $L_1$ of the first cutting edge segment 22 may typically range from 40 to 90 percent of the diameter D, or from 55 to 80 percent of the diameter D, or from 65 to 75 percent of the diameter D. The length $L_2$ of the second cutting edge segment 24 may typically range from 5 to 25 percent of the diameter D, or from 7 to 20 percent of the diameter D, or from 10 to 15 percent of the diameter D. The length $L_3$ of the transitional cutting edge segment 32 may typically range from 5 to 25 percent of the diameter D, or from 7 to 20 percent of the diameter D, or from 10 to 15 percent of the diameter D. The length $L_4$ of the wiper edge 30 may typically range from 1 to 15 percent of the diameter D, or from 1 to 10 percent of the diameter D, or from 1 to 5 percent of the diameter D.

In accordance with an embodiment of the present invention, the first cutting edge segment length $L_1$ may be greater than the sum of the second cutting edge segment length $L_2$, the transitional cutting edge segment length $L_3$ and the wiper edge length $L_4$. In certain embodiments, the transitional cutting edge segment length $L_3$ is less than the second cutting edge segment length $L_2$ and is greater than the wiper edge length $L_4$. In certain embodiments, the wiper edge length $L_4$ is less than the first cutting edge segment length $L_1$, the second cutting edge segment length $L_2$ and the transitional cutting edge segment length $L_3$. The second cutting edge segment length $L_2$ is selected to correspond to the overall cutting diameter $D_C$ of the drill body 50 to allow the peripheral drilling insert 10 and the central insert 100 to have substantially equal active cutting edges.

Figure 10:
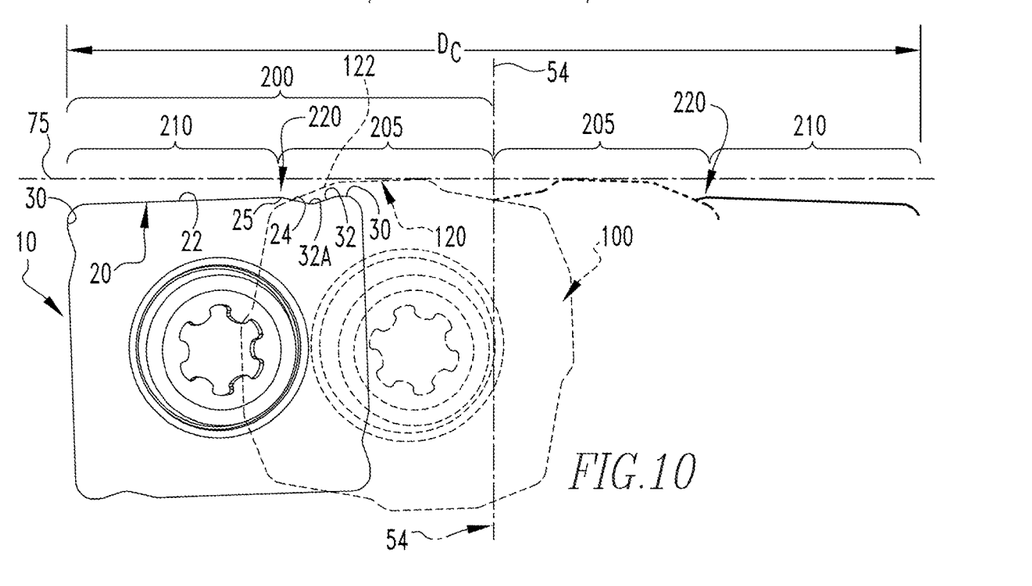
FIG. 10 is a partially schematic side view of a peripheral insert and a central drilling insert in accordance with an embodiment of the present invention.

In accordance with an embodiment of the present invention, the second cutting edge segment 24 length $L_2$ may be equal to $L_C*(D_{CL}-D_{CS})$. In certain embodiments, $L_C$ is a constant ranging from 0.25 to 0.85, $D_{CL}$ corresponds to the largest cutting diameter that the drilling insert 10 will be used with, and $D_{CS}$ corresponds to the smallest cutting diameter that the drilling insert 10 will be used with. In accordance with an embodiment of the present invention, the cutting diameter $D_C$ is provided by a cutting edge 20 of the peripheral drilling insert 10 and a cutting edge 120 of the central insert 100, as shown in FIG. 10. In accordance with an embodiment of the present invention, $L_C$ is a constant determined based upon the smallest cutting diameter $D_{CS}$, the largest cutting diameter $D_{CL}$, the transitional cutting edge angle α of the transitional cutting edge segment 32, the second cutting edge angle δ and the radius R of the corner edge portion 40. In a particular embodiment, the largest cutting diameter $D_{CL}$ may be 19 millimeters and the smallest cutting diameter $D_{CS}$ may be 16.5 millimeters. In accordance with an embodiment of the present invention, the second cutting edge segment 24 length $L_2$ being a function of $L_C*[(D_{CL}-D_{CS})]$ allows the peripheral drilling insert 10 and the central drilling insert 100 to perform a substantially equal amount of cutting.

In accordance with an embodiment of the present invention, the lengths of the cutting edge segments 22 and 24, the transitional cutting edge segment 32 and the wiper edge 30 may be varied depending on the overall size of the drilling insert 10. For example, if the diameter D of an imaginary inscribed circle 38, as shown in FIG. 3C, is increased the lengths of the cutting edge segments 22 and 24, the transitional cutting edge segment 32 and the wiper edge 30 will increase proportionally. Alternatively, if the diameter D of the imaginary inscribed circle 38, as shown in FIG. 3, is decreased the lengths of the cutting edge segments 22 and 24, the transitional cutting edge segment 32 and the wiper edge 30 will decrease proportionately.

Figure 4:
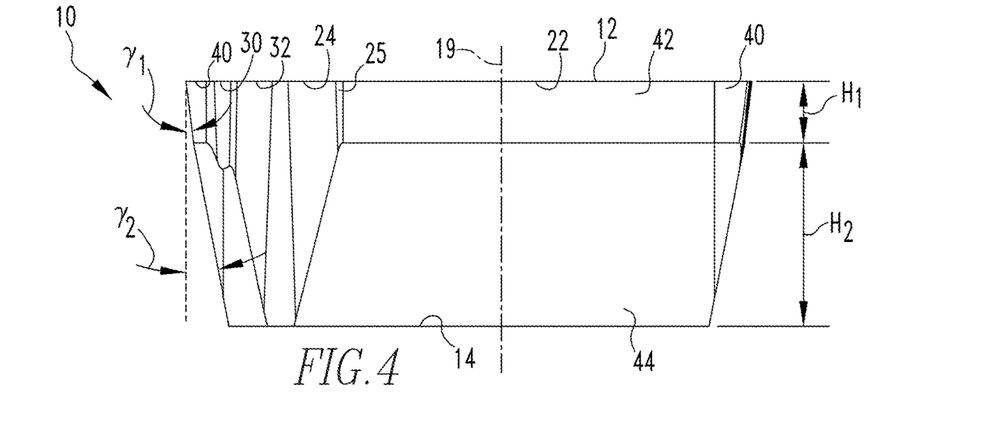
FIG. 4 is a side view of the drilling insert of FIG. 1.

As shown in FIG. 4, each side surfaces 16 comprises a first clearance face 42 extending from the top surface 12 and a second clearance face 44 extending from the first clearance face 42 to the bottom surface 14. As shown in FIG. 4, the first clearance face 42 extends toward the bottom surface 14 from the top surface 12 at a first clearance angle $\gamma_1$ with respect to the axis of rotation 19 of the drilling insert 10. For example, the first clearance angle $\gamma_1$ may be at least 1 degree, for example from 2.5 to 20 degrees, or from 5 to 15 degrees, or from 5 to 12 degrees. In a particular embodiment, the first clearance angle $\gamma_1$ may be about 7 degrees. The first clearance angle $\gamma_1$ may prevent rubbing of the first clearance face 40 against machined surfaces by providing clearance between the drilling insert 10 and the machined surface of the work piece. As shown in FIG. 4, the second clearance face 44 extends toward the bottom surface 14 from the first clearance face 42 at a second clearance angle $\gamma_2$ with respect to the axis of rotation 19 of the drilling insert 10. For example, the second clearance angle $\gamma_2$ may be at least 1 degree, for example from 5 to 40 degrees, or from 7.5 to 30 degrees, or from 10 to 20 degrees. In a particular embodiment, the second clearance angle $\gamma_2$ may be about 15 degrees. The second clearance angle $\gamma_2$ allows the drilling insert 10 be easily inserted and removed from the pocket 60 of the drilling body 50. In accordance with an embodiment of the present invention, the first clearance angle $\gamma_1$ and the second clearance angle $\gamma_2$ allow for the top surface 12 to be larger than the bottom surface 14. The first clearance angle $\gamma_1$ and the second clearance angle $\gamma_2$ further provide the first and second clearance faces 42 and 44 at orientations that allow for the drilling insert to be rigidly secured in the pocket 60 of the drilling body 50. In the embodiment shown, the second clearance angle $\gamma_2$ is greater than the first clearance angle $\gamma_1$, however any other suitable arrangement may be used, e.g., the second clearance angle $\gamma_2$ may be less than or equal to the first clearance angle $\gamma_1$.

As shown in FIG. 4, the first clearance face 42 has a height $H_1$ and the second clearance face 44 has height $H_2$. In accordance with an embodiment of the present invention, the second clearance face height $H_2$ may be greater than or equal to the first clearance face height $H_1$, e.g., up to 75 percent higher. For example, the second clearance face height $H_2$ may be at least 25 percent, or at least 35 percent, or at least 50 percent greater than the first clearance face height $H_1$. In certain embodiments, the second clearance face height $H_2$ is at least 50 percent of a total height of the drilling insert 10, e.g., at least 60 percent of the total height of the drilling insert. The first clearance face height $H_1$ and the second clearance face height $H_2$ selected to allow the drilling insert 10 to be rigidly secured within a pocket 60 of the drilling body 50. The ratio of height $H_1$ of the first clearance face 40 to the height $H_2$ of the second clearance face 42 may typically range from 1:1 to 1:10, for example, from 1:1.2 to 1:5 or from 1.5:2 to 1:3. In accordance with an embodiment of the present invention, the second clearance face 44 may provide an abutment surface to be engaged in the pocket 60, and the first clearance face 42 provides a clearance to prevent the drilling insert from contacting the sidewalls of the drilling body pocket.

The drilling inserts 10 may be made of any suitable material, such as tool steels, cemented carbides, and superhard material, such as cubic boron nitride (CBN), polycrystalline cubic boron nitride (PCBN), polycrystalline diamonds (PCD), tungsten carbide (WC), cermet, ceramic, and the like. The drilling inserts 10 of the present invention may be fabricated by any suitable technique, such as carbide powder pressing, grinding or additive manufacturing to provide the plurality of cutting edge segments and the wiper edge.

FIGS. 5-7, illustrate a drilling tool system 5 in accordance with an embodiment of the present invention. The drilling tool system 5 includes a drilling body 50 and a peripheral drilling insert 10 and a central drilling insert 100 installed within the drilling body 50. The drilling body 50 has a generally cylindrical body 52 with a rotational axis 54. In accordance with an embodiment of the present invention, the body 52 of the drilling body 50 includes a front drilling face 56, a rear mounting end 58 and a plurality of helical flutes 59. The front drilling face 56 comprises a peripheral pocket 60 structured and arranged to receive a peripheral drilling insert 10 and a central pocket 102 structured and arranged to receive a central drilling insert 100. In the embodiment shown, the body 52 of drilling body 10 includes two flutes 59, but any other suitable number of flutes may be used. For example, there may be one, three, four, five or more flutes.

Figure 8:
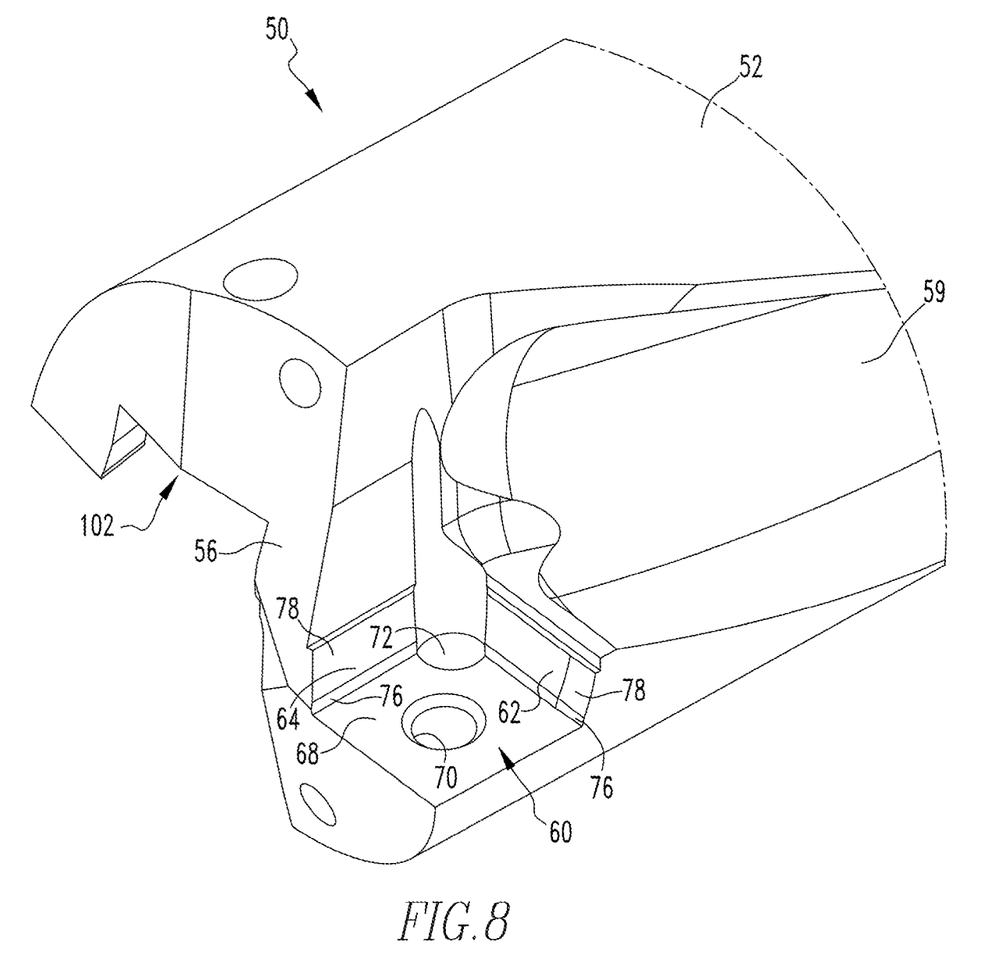
FIG. 8 is an isometric view of a drilling body in accordance with an embodiment of the present invention.

As shown in FIG. 8, the peripheral insert pocket 60 comprises a rear surface 62 and a first sidewall portion 64 extending generally perpendicularly forward from the rear surface 62. While a generally square insert pocket 60 is shown in this embodiment, any other suitable shape of insert pockets may be used, e.g., rectangular, triangular or the like. As shown in FIG. 8, the rear surface 62 may be configured to engage with a first side surface of the drilling insert 10 and the first sidewall portion 64 may be configured to accommodate a second side surface 16 of the drilling insert 10. As used herein, the terms "engage", "engages", and "engagement" and "engaging" mean that two or more features interact with each other to restrict relative movement between the drilling insert 10 and the insert pocket 60. In certain embodiments, the insert pocket 60 may comprise a bottom seating surface 68 perpendicular to the rear surface 62 and the first sidewall portion 64. The bottom seating surface 68 may be configured to engage the bottom surface 14 of the cutting insert 14. As shown in FIG. 8, the bottom seating surface 68 includes a threaded mounting hole 70 that may be configured to receive a mechanical fastener 90 to secure the drilling insert 10 in the insert pocket.

As shown in FIG. 8, the rear surface 62 and the first sidewall portion 64 each include first and second surfaces 76 and 78 structured and arranged to receive the first and second clearance surfaces 42 and 44 of the drilling insert 10. In accordance with an embodiment of the present invention, the first surface 76 may be a clearance surface and the second surface 78 may engage the second clearance face 44 of the drilling insert 10. The first and second engagement surfaces 76 and 78 of the rear surface 62 and the first sidewall portion 64 allow for the drilling insert to be more rigidly mounted in the pocket 60.

As shown in FIG. 8, the pocket 60 may include a recessed channel 72 in the corner between the rear surface 62 and the first sidewall portion 64. The recessed channel 72 provides an interference clearance for the insert pocket 60 to receive the drilling insert 10. The side surface 16 contacting the rear surface 62 may experience the most force during a drilling operation. In accordance with an embodiment of the present invention, any suitable size or shape of insert pocket 60 may be used to engage any shape or size of indexable drilling insert 10.

In accordance with an embodiment of the present invention, the insert pocket 60 and the peripheral drilling insert 10 are structured and arranged to allow the central insert 100 to make first contact with a workpiece.

The drilling body 50 may be made of any suitable material, such as steel, aluminum, titanium or any other material having sufficient strength. The drilling body 50 of the present invention may be fabricated by any suitable technique, such as machining to provide the insert pockets and flutes.

As shown in FIGS. 9 and 10, the cutting edge 20 of the peripheral drilling insert 10 and the cutting edge 120 of the peripheral insert 100 form a cutting profile 200. FIG. 9 illustrates in phantom the positioning of the peripheral insert 10 compared to the central drilling insert 100 when the drilling body 50 is rotated 180 degrees about its central longitudinal rotational axis 54 in accordance with an embodiment of the present invention. As shown in FIG. 10, the cutting edge 20 of the peripheral drilling insert 10 forms an outer portion 210 of the cutting profile 200 and the cutting edge 120 of the central insert 100 forms an inner portion 205 of the cutting profile 200 relative to the central longitudinal rotational axis 54. The cutting profile 200 formed by the cutting edge 20 of the peripheral drilling insert 10 and the cutting edge 120 of the central insert 100 is symmetrical about the central longitudinal rotational axis 54 of the drilling body 50. The rotation of the cutting profile 200 about the rotational axis forms the cutting diameter $D_C$ of the drilling tool system 5.

In accordance with an embodiment of the present invention, the cutting edge 20 of the peripheral drilling insert 10 may overlap with the cutting edge 120 of the central insert 100. In accordance with an embodiment of the present invention, the peripheral drilling insert 10 overlapping with the central insert 100 may protect the inactive axially forward and radially inward wiper edge 30 and the transitional cutting edge segment 32 from contacting the work piece to prevent wear. As shown in FIG. 10, an intersection point 220 is formed at the point that the first cutting edge segment 22 overlaps with the cutting edge 120 of the central insert 100. In accordance with an embodiment of the present invention, the intersection point 220 is selected to allow the length of the inner portion 205 of the cutting profile 200 to be substantially equal to the length of the outer portion 210 of the cutting profile 200. However, in accordance with an embodiment of the present invention, the length of the inner portion 205 may be unequal to the length of the outer portion 210.

FIGS. 9 and 10 illustrate that the cutting edge 120 of the central insert 100 forms the most axially forward portion of the cutting profile 200. This allows the central insert 100 to make first contact the work piece. In accordance with an embodiment of the present invention, a partial length of the inner portion 205 of the cutting profile 200 is more axially forward than the outer portion 210 of the cutting profile 200.

As shown in FIG. 10, a horizontal plane 75 is normal to the central longitudinal rotational axis 54 of the drilling body 50. In the embodiment shown, the first cutting edge segment 22 is tilted with respect to the horizontal plane 75 at a negative angle. For example, the first cutting edge segment 22 of the drilling insert 10 may form an angle of from 0 to 5 degrees with respect to the horizontal plane 75.

Figure 11:
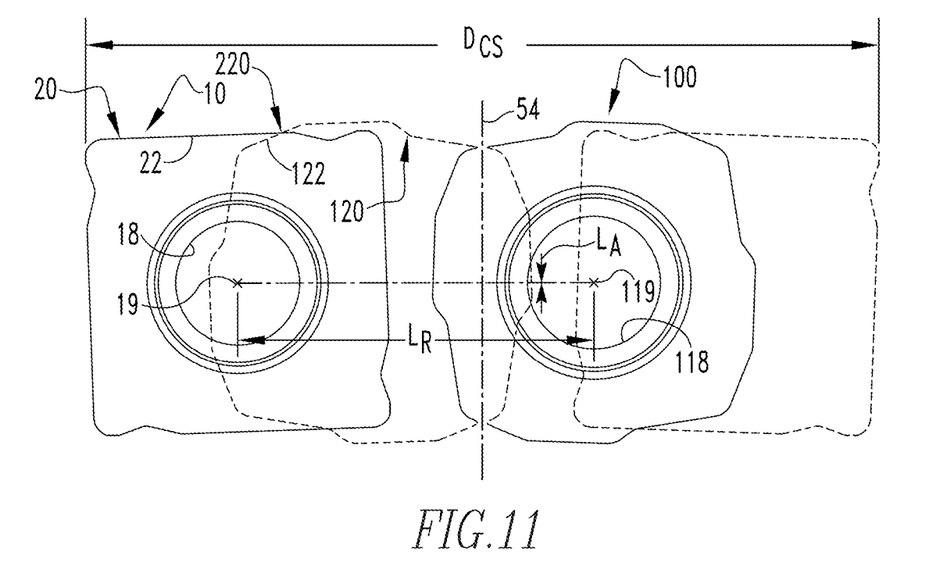
FIG. 11 is a partially schematic side view of the location of a peripheral insert compared to a central insert in accordance with an embodiment of the present invention.
Figure 12:
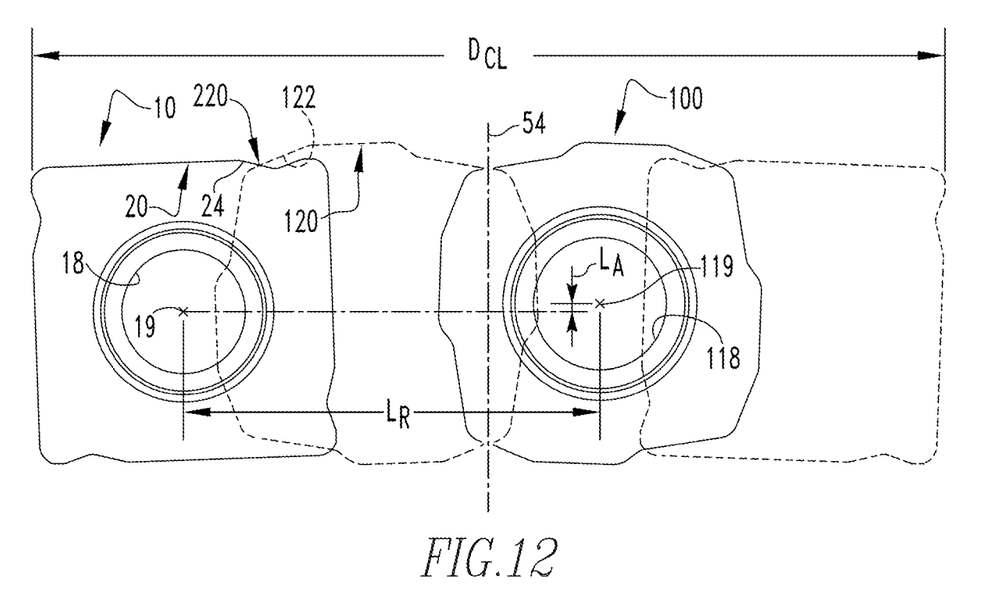
FIG. 12 is a partially schematic side view of the location of a peripheral insert compared to a central insert in accordance with another embodiment of the present invention.

FIGS. 11 and 12 illustrate the locations of the peripheral insert 10 compared to a central insert 100 in accordance with another embodiment of the present invention. The location of the inserts represents the location of the inserts when mounted in the peripheral pocket 60 and the central pocket 102 of the drilling body 50. In accordance with an embodiment of the present invention, an identically sized peripheral insert 10 and an identically sized central insert 100 may be used for a range of cutting diameters $D_C$. In accordance with an embodiment of the present invention, the different cutting diameters $D_C$ may be provided by drill bodies having different overall diameters. The peripheral insert 10 and the central insert 100 are structured and arranged to achieve the desired force balance, cutting performance and surface finish over a desired range of cutting diameters $D_C$ and drill body diameters. The orientation and length of the plurality of cutting edge segments the peripheral drilling insert 10 and the plurality of cutting edge segments of the central insert 100 are selected to allow substantially equal cutting to be performed by the peripheral drilling insert 10 and the central insert 100.

In accordance with an embodiment of the present invention, the axial and radial location of the central insert 100 and the central pocket 102 of the drilling body 50 may be fixed for a range of cutting diameters $D_{CS}$-$D_{CL}$. In certain embodiments, the central pocket 102 is not moved to adjust the cutting diameter $D_C$ of the drilling tool system 5 for a select insert size. For example, an axis of rotation 119 of a mounting through hole 118 of the central insert 100 may define the axial and radial location of the central insert 100. As shown in FIG. 11, the axis of rotation 119 of the central insert 100 is located at an axial and radial location with respect to the central longitudinal axis 54 for the smallest cutting diameter $D_{CS}$ for a given insert size. As shown in FIG. 12, the axis of rotation 119 of the central insert 100 is located at the same axial and radial location with respect to the central longitudinal axis 54 for the largest cutting diameter $D_{CL}$ for a select insert size. In accordance with an embodiment of the present invention, a single size of central drilling insert 100 is structured and arranged to be provided at a single location for a range of cutting diameters $D_{CS}$-$D_{CL}$ while maintaining the desired force direction, balance of force and substantially equal active cutting length for the central and peripheral drilling inserts.

In accordance with an embodiment of the present invention, the peripheral drilling insert 10 and the outer pocket 60 of the drilling body 50 may be moved axially and/or radially to accommodate a range of cutting diameters $D_{CS}$-$D_{CL}$. For example, the peripheral drilling insert 10 and the outer pocket 60 of the drilling body 50 may be moved radially outward and axially rearward with respect to the central longitudinal rotational axis 54 to provide a larger cutting diameter $D_C$. As shown in FIG. 11, the axis of rotation 19 of the peripheral drilling insert 10 is located at a first axial location and a first radial location for the smallest cutting diameter $D_{CS}$ for a select insert size. As shown in FIG. 12, the axis of rotation 19 of the peripheral drilling insert 10 is located at a second axial location and a second radial location for the largest cutting diameter $D_{CL}$ for a select insert size. In accordance with an embodiment of the present invention, modifying the axial and/or radial position of the peripheral drilling insert 10 and the outer pocket 60 of the drilling body 50 allows for a fixed location of the central insert 100 and the central pocket 102 of the drilling body 52 to be used for a range of cutting diameters $D_{CS}$-$D_{CL}$ while maintaining the desired force direction, balance of force and substantially equal active cutting length for the central and peripheral drilling inserts.

In certain embodiments, the plurality of cutting edge segments of the peripheral drilling insert 10 and the plurality of cutting edge segments of the central drilling insert 100 allows the intersection point 220 formed between the cutting edge 20 of the peripheral drilling insert 10 and the cutting edge 120 of the central drilling insert 100 to be formed at a desired location along the cutting profile. As shown in FIG. 11, the intersection point 220 may be located between the radially outermost cutting edge segment 122 of the central drilling insert 100 and the first cutting edge segment 22 of the peripheral drilling insert 10. As shown in FIG. 12, the intersection point 220 may be located between the radially outermost cutting edge segment 122 of the central drilling insert 100 and the second cutting edge segment 24 of the peripheral drilling insert 10.

In accordance with an embodiment of the present invention, the intersection point 220 is located on the radially outermost cutting edge segment 122 of the central drilling insert 100 to allow at least a portion of the cutting edge 120 to be axially forward of the cutting edge 20 of the peripheral drilling insert 10. This may allow the central drilling insert 100 to make first contact with the work piece. In accordance with an embodiment of the present invention, the radially outermost cutting edge segment 122 of the central insert 100 may be provided at a negative angle away from the horizontal plane 75 to allow for the intersection point 220 is located at the desired location on the cutting edge 20 of the peripheral insert 10.

As shown in FIGS. 11 and 12, the axis of rotation 19 of the peripheral drilling insert 10 may be spaced from the axis of rotation 119 of the central insert 100 by a radial offset length $L_R$ and an axial offset length $L_A$. The radial offset length $L_R$ and the axial offset length $L_A$ are selected to provide a desired cutting diameter $D_C$ and the desired intersection point 220. In accordance with an embodiment of the present invention, the radial offset length $L_R$ may typically range from 2.5 to 25 mm, or from 5 to 20 mm, or from 7.5 to 17.5 mm. For example, the radial offset length $L_R$ may be at least 30 percent of the cutting diameter $D_C$, e.g., at least 40 percent or at least 50 percent. In accordance with an embodiment of the present invention, the axial offset length $L_A$ may typically range from 0 to 10 mm, or from 0.5 to 7.5 mm, or from 1 to 5 mm. The radial offset length $L_R$ and the axial offset length $L_A$ are modified by changing the location of the peripheral drilling pocket 60 with respect to the central drilling pocket 102. In accordance with an embodiment of the present invention, the axis of rotation 19 of the peripheral drilling insert 10 when mounted in the peripheral drilling pocket 60 may be axially forward or rearward by the axial offset length $L_A$ from the axis of rotation 119 of the central insert 100 when mounted in the central drilling pocket 102.

As used herein, "including," "containing" and like terms are understood in the context of this application to be synonymous with "comprising" and are therefore open-ended and do not exclude the presence of additional undescribed or unrecited elements, materials, phases or method steps. As used herein, "consisting of" is understood in the context of this application to exclude the presence of any unspecified element, material, phase or method step. As used herein, "consisting essentially of" is understood in the context of this application to include the specified elements, materials, phases, or method steps, where applicable, and to also include any unspecified elements, materials, phases, or method steps that do not materially affect the basic or novel characteristics of the invention.

For purposes of the description above, it is to be understood that the invention may assume various alternative variations and step sequences except where expressly specified to the contrary. Moreover, all numbers expressing, for example, quantities of ingredients used in the specification and claims, are to be understood as being modified in all instances by the term "about". Accordingly, unless indicated to the contrary, the numerical parameters set forth are approximations that may vary depending upon the desired properties to be obtained by the present invention. At the very least, and not as an attempt to limit the application of the doctrine of equivalents, each numerical parameter should at least be construed in light of the number of reported significant digits and by applying ordinary rounding techniques.

It should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. In this application, the articles "a," "an," and "the" include plural referents unless expressly and unequivocally limited to one referent.

Whereas particular embodiments of this invention have been described above for purposes of illustration, it will be evident to those skilled in the art that numerous variations of the details of the present invention may be made without departing from the invention as defined in the appended claims.

The invention claimed is:

1. A drilling insert comprising:
   a top surface;
   a bottom surface having a smaller surface area than the top surface;
   four side surfaces adjoining the top surface and the bottom surface;
   four cutting edges at the intersection of each of the side surfaces and the top surface defining four corner edge portions at intersections between adjacent cutting edges, each of the cutting edges comprising:
     a first cutting edge segment extending from a first one of the corner edge portions that is located radially outward from a central longitudinal rotational axis of a drilling body when the drilling insert is mounted in the drilling body;
     a second cutting edge segment extending from the first cutting edge at a second cutting edge angle with respect to the first cutting edge segment; and
     a linear wiper edge located radially inward from the central longitudinal rotational axis of the drilling body in relation to the first cutting edge segment at a wiper edge angle with respect to the first cutting edge segment to a second one of the corner portions, wherein the wiper edge angle is a negative angle with respect to the first cutting edge segment ranging from about 0.5 to about 10 degrees.

2. The drilling insert of claim 1, wherein the first cutting edge segment and the second cutting edge segment are linear.

3. The drilling insert of claim 1, wherein a radially outermost wiper edge is parallel with the central longitudinal rotational axis of the drilling body when the drilling insert is mounted in the drilling body.

4. The drilling insert of claim 1, wherein the second cutting edge angle is a negative angle with respect to the first cutting edge segment ranging from about 2.5 to about 75 degrees.

5. The drilling insert of claim 1, wherein the second cutting edge segment and the wiper edge are joined together by a transitional cutting edge segment, the transitional cutting edge segment forming a concave curve with the second cutting edge segment and a convex curve with the wiper edge.

6. The drilling insert of claim 5, wherein the transitional cutting edge segment comprises a linear portion.

7. The drilling insert of claim 6, wherein the linear portion of the transitional cutting edge segment extends from the second cutting edge segment at a transitional cutting edge angle with respect to the first cutting edge segment, the transitional cutting edge angle is a positive angle ranging from about 5 to about 65 degrees.

8. The drilling insert of claim 7, wherein the transitional cutting edge angle is less than or equal to the second cutting edge angle.

9. The drilling insert of claim 5, wherein a length of the wiper edge is less than a length of the first cutting edge segment, a length of the second cutting edge segment and a length of the transitional cutting edge segment.

10. The drilling insert of claim 1, wherein a length of the first cutting edge segment is greater than a length of the second cutting edge segment and a length of the wiper edge.

11. The drilling insert of claim 1, wherein each side surface comprises a first clearance face extending from the top surface and a second clearance face extending from the first clearance face to the bottom surface, and a height of the second clearance face is greater than or equal to the height of the first clearance face.

12. The drilling insert of claim 1, wherein the height of the first clearance face is less than 50 percent of a total height of the drilling insert.

13. The drilling insert of claim 12, wherein the first clearance face forms an angle ranging from about 2.5 to about 20 degrees with respect to a central longitudinal axis of the drilling insert, and the second clearance face forms an angle ranging from about 5 to about 40 degrees with respect to the central longitudinal axis of the drilling insert.

14. The drilling insert of claim 1, wherein the drilling insert is a peripheral drilling insert.

15. The drilling insert of claim 1, wherein the wiper edge is not continuous with the first cutting edge segment.

\* \* \* \* \*